US009243647B2

(12) United States Patent
Evans

(10) Patent No.: US 9,243,647 B2
(45) Date of Patent: Jan. 26, 2016

(54) AIRCRAFT PROPULSION SYSTEM NACELLE

(71) Applicant: ROLLS-ROYCE PLC, London (GB)

(72) Inventor: Dale Edward Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 528 days.

(21) Appl. No.: 13/765,943

(22) Filed: Feb. 13, 2013

(65) Prior Publication Data

US 2013/0216364 A1  Aug. 22, 2013

(30) Foreign Application Priority Data

Feb. 20, 2012  (GB) .................... 1202790.0

(51) Int. Cl.
*F04D 29/40* (2006.01)
*F02C 7/04* (2006.01)

(52) U.S. Cl.
CPC . *F04D 29/40* (2013.01); *F02C 7/04* (2013.01); *Y02T 50/672* (2013.01)

(58) Field of Classification Search
CPC ........... F01D 1/02; F01D 25/24; F01D 25/28; F02C 7/04; F02C 7/042; F02C 7/05; F02C 7/20
See application file for complete search history.

(56) References Cited

U.S. PATENT DOCUMENTS

| | | | | |
|---|---|---|---|---|
| 7,374,403 B2 * | 5/2008 | Decker | .................... | F01D 5/141 416/223 A |
| 8,181,441 B2 * | 5/2012 | Smith | .................... | F01D 17/10 60/204 |
| 8,678,743 B1 * | 3/2014 | Sheridan | .................... | F02C 7/36 415/1 |
| 9,121,368 B2 * | 9/2015 | Gallagher | .................... | F01D 17/14 |
| 2010/0068051 A1 * | 3/2010 | Cloft | .................... | B64D 33/02 415/220 |
| 2010/0124494 A1 * | 5/2010 | Howarth | .................... | B64D 29/00 415/213.1 |
| 2010/0155525 A1 * | 6/2010 | Stuart | .................... | B64D 27/26 244/54 |
| 2010/0260602 A1 * | 10/2010 | Binks | .................... | B64D 29/08 415/214.1 |

FOREIGN PATENT DOCUMENTS

| | | |
|---|---|---|
| EP | 2 163 748 A1 | 3/2010 |
| EP | 2 202 153 A2 | 6/2010 |
| EP | 2 241 504 A2 | 10/2010 |
| WO | WO 2010/059301 A2 | 5/2010 |

OTHER PUBLICATIONS

Jun. 14, 2012 British Search Report issued in British Patent Application No. GB1202790.0.

* cited by examiner

*Primary Examiner* — Igor Kershteyn
(74) *Attorney, Agent, or Firm* — Oliff PLC

(57) ABSTRACT

An aircraft propulsion system has an engine assembly having an axis of rotation, a fan assembly operatively connected to the engine assembly and comprising a plurality of fan blades arranged circumferentially around the axis of rotation and a monolithic nacelle assembly which circumferentially encloses the fan assembly. The propulsion system has a ratio of fan assembly outer diameter to nacelle assembly outer diameter of at least 0.87. As a result, the propulsion system provides for a significantly larger fan assembly outer diameter for a given nacelle assembly outer diameter than a conventional prior art turbofan engine, thereby increasing the specific power output or the bypass ratio of the propulsion system, which will result in improved propulsive efficiency without an increase in nacelle drag.

15 Claims, 7 Drawing Sheets

AIRCRAFT PROPULSION SYSTEM NACELLE

This invention claims the benefit of UK Patent Application No. 1202790.0, filed on 20 Feb. 2012, which is hereby incorporated herein in its entirety.

FIELD OF THE INVENTION

This invention relates to aircraft propulsion systems and particularly, but not exclusively, to aircraft propulsion systems which utilize ducted turbofan type engines generally characterized by a high bypass ratio.

BACKGROUND TO THE INVENTION

As shown in FIG. 1, an axial flow gas turbine turbofan engine 10 comprises an air intake 11, a low pressure compressor (or fan) 12, an intermediate pressure compressor 13, a high pressure compressor 14, a combustor 15, a high pressure turbine 16, an intermediate pressure turbine 17, a low pressure turbine 18, and an exhaust nozzle 19. A nacelle assembly 20 encloses the fan 12.

In operation, air is drawn into the engine 10 through the intake 11 and accelerated by the fan 12, to produce two air flows: a first air flow which enters the intermediate pressure compressor 13 and a second air flow which bypasses the core of the engine to provide direct propulsive thrust.

The ratio between the mass flow rates of these first and second air flows is termed the bypass ratio.

The first air flow entering the intermediate pressure compressor 13 is compressed before entering the high pressure compressor 14 where further compression takes place.

The compressed air leaving the high pressure compressor 14 is directed into the combustor 15 where it is mixed with fuel and the resulting mixture is combusted. The high pressure combustion products then rapidly expand as they pass through and drive the high, intermediate and low pressure turbines 16, 17 and 18. The gas leaving the low pressure turbine 18 is then exhausted through the exhaust nozzle 19 and provides additional propulsive thrust.

The high, intermediate and low pressure turbines 16, 17 and 18 respectively drive the high and intermediate pressure compressors 14 and 13 and the fan 12 by means of separate interconnecting shafts.

It is known that increasing the bypass ratio of a turbofan engine can reduce its fuel consumption and consequent level of $CO_2$ emissions. This characteristic has been exploited by engine manufacturers by progressively increasing the bypass ratios of modern turbofan engines.

However, there is a limit to how much the bypass ratio can be increased as eventually the weight and drag penalties associated with the size of the required engine nacelle outweigh the reduction in fuel consumption.

Most turbofan engines are designed to be capable of being mounted in an under-wing configuration. Such a configuration provides an upper limit to the nacelle diameter so as to maintain safe working ground clearance beneath the engine when it is installed on the aircraft.

Furthermore, turbofan engines typically have a relatively deep nacelle which encloses the fan and the core engine. This nacelle depth, in combination with the need to maintain a minimum safe ground clearance, limits the diameter of fan which can be employed on the engine.

STATEMENTS OF INVENTION

According to an aspect of the present invention there is provided an aircraft propulsion system nacelle comprising:
an engine assembly; and
a fan assembly operatively connected to the engine assembly, and comprising a plurality of fan blades arranged circumferentially around an axis of rotation; and
a monolithic nacelle structure which circumferentially encloses the fan assembly, and comprises a first, radially proximal, surface locatable radially outward of the plurality of blades, and an opposite, second, radially distal, surface which forms a radially outermost surface of the nacelle assembly.

In the following description, the terms 'forward' and 'rearward' are to be understood to relate to air inlet and outlet portions of the nacelle assembly respectively, along the axis of rotation of the fan. In addition, the term 'axial' is understood to relate to the direction of the axis of rotation of the fan assembly.

A conventional turbofan engine nacelle employs a monocoque type construction and has a maximum nacelle depth of approximately 300 mm (12 in). The space within the nacelle is used to accommodate various engine ancillaries and a thrust reverser mechanism. Relocating these engine ancillaries to the core engine and providing reverse thrust provision through a variable pitch fan assembly enables the nacelle structure to be formed as a monolithic structure which can be made significantly thinner in the radial direction, and therefore lighter, than a conventional nacelle assembly. For example, a monolithic nacelle structure according to the present invention has a depth of only approximately 100 mm (4 in).

This means that for a given overall engine nacelle diameter, the engine of the present invention can employ a fan having a diameter that is approximately 400 mm (16 in) larger than that of a conventional turbofan engine. This increase in fan diameter results in the engine of the present invention having a significantly larger fan swept area, which can reduce fuel consumption, increase propulsive efficiency and reduce exhaust emissions.

The reduction in nacelle weight of the turbofan engine of the present invention means that the engine may have a larger diameter fan without any significant increase in overall engine weight or drag. This in turn means that no additional strengthening of aircraft engine mounting points is necessary to accommodate the engine of the present invention. Any additional drag would otherwise adversely affect aircraft efficiency (for example, through nett engine thrust acting on the engine pylon).

Optionally, the nacelle structure further comprises an integral, energy absorbing, containment portion positioned radially distal to the first surface of the nacelle structure.

To satisfy regulatory requirements, turbofan engines are required to demonstrate that if part or all of a fan blade were to become detached from the remainder of the fan, that the detached parts are suitably captured within an energy absorbing, containment system.

In a conventional turbofan engine, the containment system is removably secured to a radially inner facing surface of the fan casing by front and rear fasteners.

The use of an integral, energy absorbing, containment portion eliminates the need for fasteners, making the nacelle structure simpler, more compact and lighter.

Optionally, the nacelle structure is formed as a metal forging, with the metal being selected from the group comprising steel, titanium, aluminum and alloys thereof.

By forming the nacelle structure from a metal forging, its radial thickness may be smaller than a conventional nacelle structure formed with a monocoque construction. This allows for a correspondingly larger diameter fan assembly.

Optionally, the nacelle structure is formed from a fiber reinforced composite material, with the composite fiber being selected from the group comprising glass, carbon, boron, aramid and combinations thereof.

An advantage of using a fiber reinforced composite material to form the nacelle structure is that its weight may be reduced over a nacelle structure formed from a metallic material. However, since such composite materials have a lower density than metals, it is likely that the radial depth of a composite nacelle will be greater than that of a metallic nacelle.

Optionally, a radial thickness of the nacelle structure is greater at a first, inlet portion than at a plane of the fan assembly normal to the axis of rotation.

For a typical conventional turbofan nacelle structure, the radial thickness of the nacelle structure is greatest over the portion of axial length corresponding approximately to the fan blades. This ensures that the nacelle structure has sufficient internal volume to accommodate the various engine ancillaries and thrust reversing mechanisms which are normally located within the nacelle, whilst also providing sufficient mechanical strength and rigidity to contain a released fan blade.

A monolithic nacelle structure according to the invention can be made significantly thinner in the radial direction than a conventional nacelle structure, by virtue of the sandwich construction of an outer nacelle barrel and liner system within that provides structural stiffness and a containment function.

Optionally, the nacelle structure comprises one or more voids.

By forming a void, or cavity, on a radially distal surface of the nacelle structure, it is possible to accommodate one or more engine ancillaries, such as an engine control unit.

The presence of such a void may also reduce the weight of the nacelle structure, particularly in regions of the structure, such as the forward, inlet portion, which are of increased radial thickness.

Optionally, at least one of the one or more voids is filled with a material having a lower density than the material forming the nacelle structure.

The density of the void filler material may be dictated by the requirement to provide resistance to foreign object damage (FOD) and general structural duty requirements.

In one arrangement of the invention, any such voids are filled with a low density material, such as an expanded closed cell foam material, in order to minimize the additional weight of such void filler material.

Optionally, the fan assembly has a fan pressure ratio of less than 1.3.

In this context, the term 'fan pressure ratio' is defined as follows:

$$\text{Fan Pressure Ratio} = \frac{\text{fan outlet total pressure}}{\text{inlet delivery total pressure}}$$

A conventional turbofan aircraft engine typically has a fan pressure ratio that is greater than 1.5.

A benefit of a fan which has a low fan pressure ratio is that the fan blade tip speed is reduced, which in turn reduces the level of noise generated by the engine fan.

Optionally, a ratio of an outer diameter of the fan assembly to an outer diameter of the nacelle assembly is greater than 0.87.

A typical conventional turbofan aircraft engine with a 3.56 m (140 in) diameter fan has a nacelle outer diameter of approximately 4.47 m (176 in). Such an engine will have a ratio of an outer diameter of the fan assembly to an outer diameter of the nacelle assembly of approximately 0.79.

By decreasing the radial thickness of the nacelle structure it is possible to increase the fan diameter for a given nacelle structure outer diameter.

This may result in an engine having a higher thrust output (by virtue of the larger fan diameter) than a conventional turbofan engine of comparable nacelle structure outer diameter.

Alternatively, this may result in an engine having the same thrust output as a corresponding conventional turbofan engine, but with a lower pressure ratio, lower blade tip speed and higher bypass ratio (by virtue of the larger fan diameter). This in turn results in decreased noise level and increased engine efficiency without any increase in nacelle drag.

Optionally, the containment liner assembly comprises a plurality of energy absorbing panels, each panel extending axially along the first surface of the nacelle structure.

By arranging the containment system as a plurality of energy absorbing panels, it becomes easier and more convenient to install the liners into the nacelle structure to complete the containment system.

Optionally, at least one of the plurality of energy absorbing panels is individually replaceable.

In the event that the containment system is damaged by impact, it will be necessary to repair or replace only those individual panels which have been damaged.

In one embodiment of the invention, by removing one or more individual panels it becomes possible to remove a single, variable pitch fan blade without the need to dismantle the nacelle structure itself. This makes minor repair and servicing tasks which involve only a single fan blade more convenient and cost effective than prior art techniques.

Optionally, the aircraft propulsion system nacelle comprises a nacelle structure support, the nacelle structure support being attached to the engine assembly, and the nacelle structure being removably attached to the nacelle structure support to thereby expose the fan rotor assembly.

In an embodiment of the invention, the aircraft propulsion system nacelle is split laterally into a forward, nacelle structure and a rearward, nacelle structure support, with the plane of the split being normal to the axis of rotation. The rearward, nacelle structure support is removably attached to the forward, nacelle structure in order to provide access to the core engine for maintenance and repair purposes.

Optionally, the nacelle structure comprises an inlet diffuser.

In one embodiment of the invention, the forward, nacelle structure is formed with a flow controlled inlet diffuser.

The inlet diffuser decreases the velocity of the air flow entering the fan assembly whilst at the same time increasing the pressure of the air flow. The geometry of the inlet diffuser is important to smooth the air flow into the fan assembly in order to minimize flutter and forced vibration of the fan blades.

Optionally, a ratio of the combined length of the nacelle structure and nacelle structure support to an outer diameter of the fan assembly is less than 1.25.

In a conventional turbofan engine, the ratio of the length of the nacelle structure to an outer diameter of the fan assembly is typically greater than approximately 1.35 to 1.40.

In an embodiment of the present invention, by forming the nacelle structure as a monolithic component having a smaller radial thickness than a conventional nacelle structure, and particularly by eliminating the nacelle mounted thrust reversing assembly, it becomes possible to reduce the axial length of the nacelle structure.

The reduced length of the nacelle structure reduces the wetted area of the nacelle and thereby reduces the skin drag, thereby increasing the aerodynamic efficiency of the nacelle structure.

Optionally, the aircraft propulsion system further comprises a thrust reverser means operable to produce reverse thrust by selectively varying a pitch angle of the plurality of fan blades.

In a conventional, aircraft turbofan engine the thrust reversing facility is typically provided by a mechanism which is housed in a rearward portion of the nacelle structure. In order to reduce the radial thickness of the nacelle structure it becomes necessary to remove the thrust reversing mechanism from the nacelle.

In the present invention the use of a variable pitch fan (in which the fan blade pitch angle may be reversed) enables the fan assembly to direct the thrust forwards.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 3:
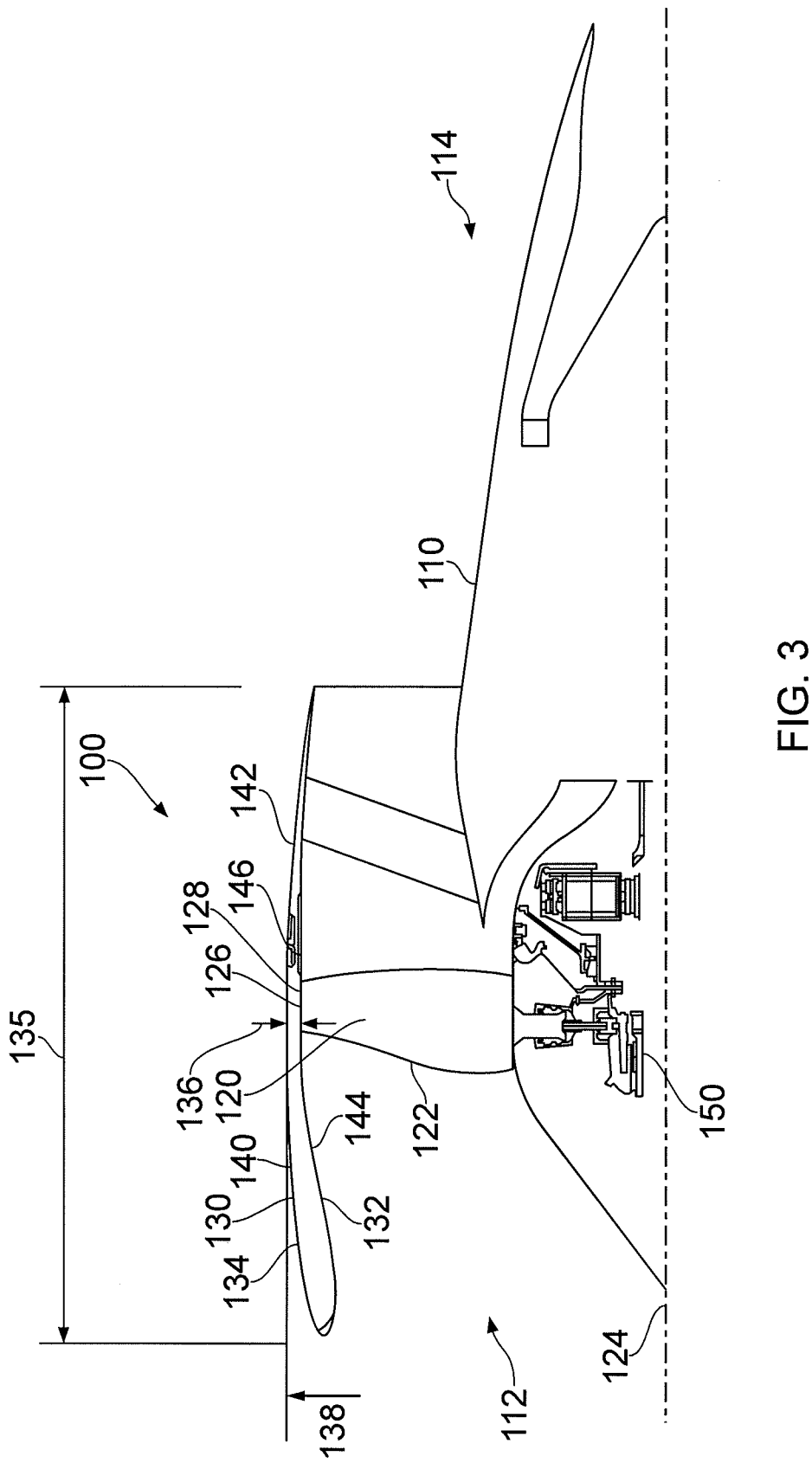
FIG. 3 shows a schematic, partial sectional view of a high bypass ratio aircraft gas turbine engine according to an embodiment of the present invention.
Figure 4:
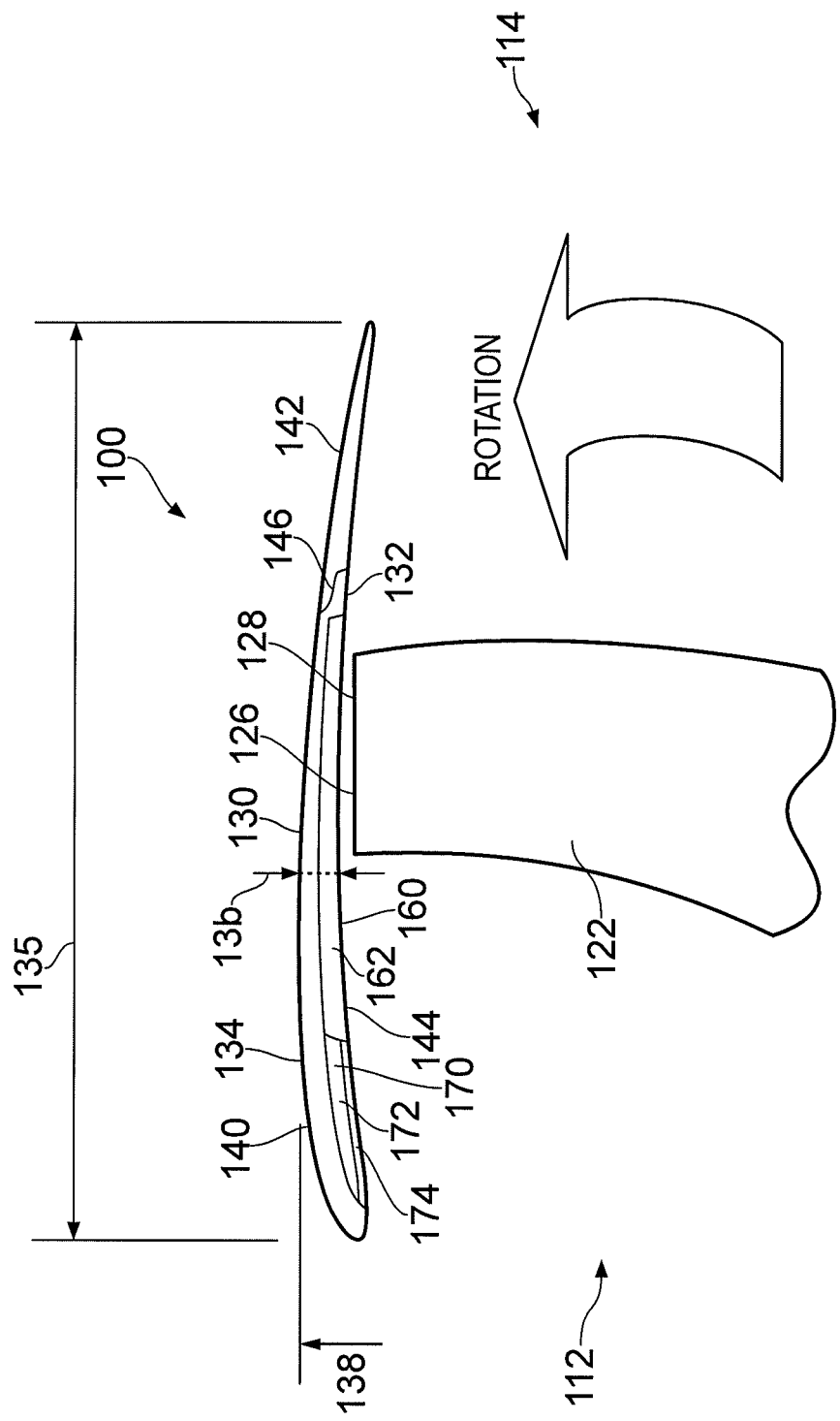
FIG. 4 shows a schematic, partial sectional view of the nacelle of the engine of FIG. 3.

Referring to FIGS. 3 and 4, an aircraft propulsion system nacelle according to a first embodiment of the invention is designated generally by the reference numeral 100.

The aircraft propulsion system nacelle 100 comprises an engine assembly 110, a fan assembly 120 which is operatively connected to the engine assembly 110, and a nacelle structure 130 which circumferentially encloses the fan assembly 120. The engine assembly 110 has an inlet 112 and an exhaust 114.

In this embodiment of the invention, the engine assembly 110 is a gas turbine engine having a conventional three-shaft configuration and having an axis of rotation 124.

In the following description, the term 'axially' is to be understood to relate to the direction of the axis of rotation 124. Similarly, the terms 'forward' and 'rearward' are to be understood to refer to the inlet 112 and exhaust 114 ends of the engine assembly 110 respectively.

The fan assembly 120 comprises a plurality of fan blades 122 which are arranged circumferentially around the axis of rotation 124.

The nacelle structure 130 is formed as a monolithic component and comprises a first, radially proximal surface 132 and a second, radially distal surface 134. The first surface 132 is positioned immediately radially outward of an outer circumference 126 of the fan assembly 120. The second surface 134 forms a radially outward surface of the nacelle structure 130.

In the present embodiment the nacelle structure 130 is formed as a fiber reinforced composite barrel 156 having a first radially proximal surface 132 and a second radially distal surface 134.

The nacelle structure 130 includes an energy absorbing, containment portion 160 which is located between the outer circumference 126 of the fan assembly 120 and the first surface 132 of the nacelle structure 130.

In the present embodiment, the containment portion 160 is arranged to extend circumferentially around the axis of rotation 124, and axially forward and rearward of the fan assembly 120. A first, radially proximal surface 162 of the containment portion 160 is contiguous with the first, radially proximal surface 132 of the nacelle structure 130, forward and rearward of the containment portion 160.

Figure 5:
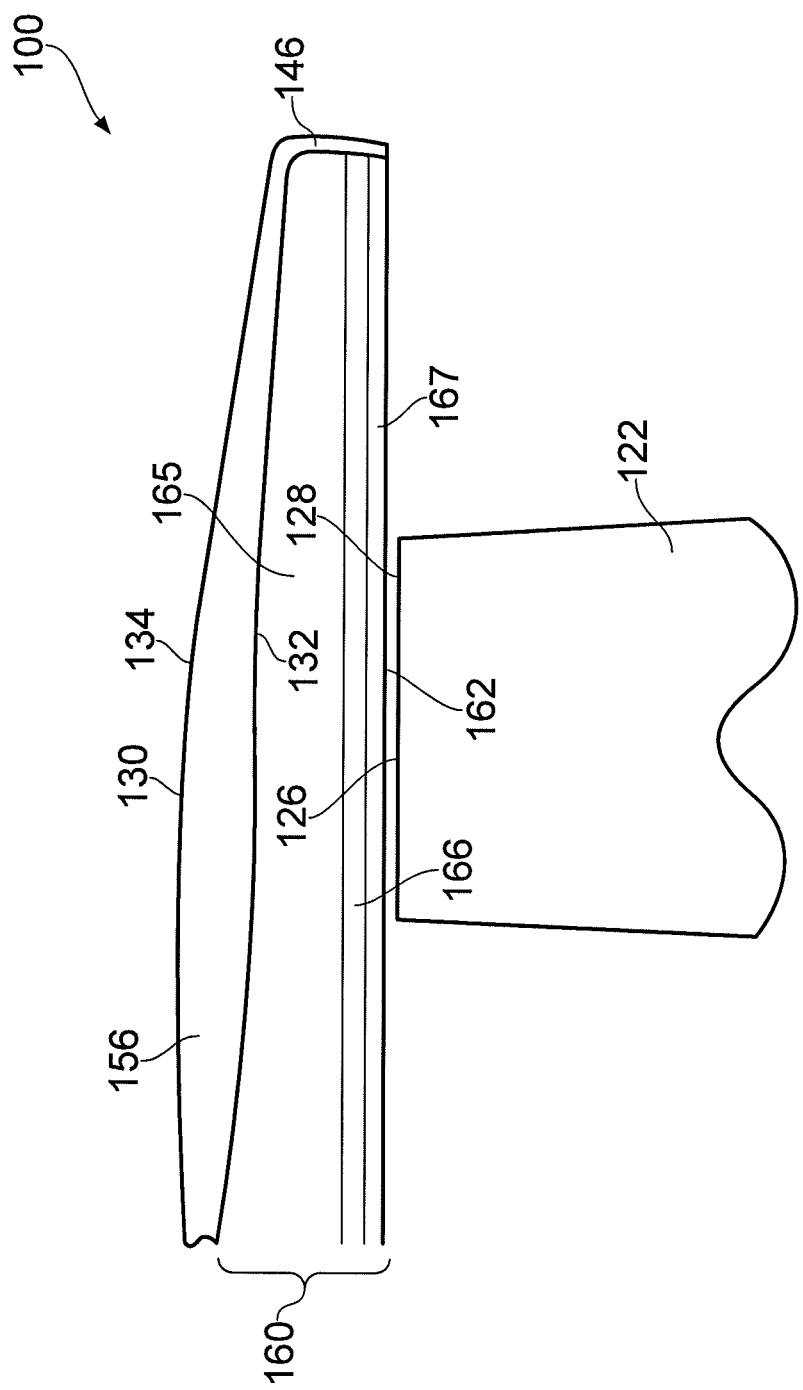
FIG. 5 shows a schematic partial sectional view of the nacelle of FIG. 4.

As shown in FIG. 5, the containment portion 160 includes a layered radial arrangement of an abradable liner 167, a layer of high density honeycomb material 166 and a layer of low density honeycomb material 165. These layers 165, 166, 167 are bonded together (separated by carbon or glass fiber laminate) with the composite barrel 156 to form a sandwich structure 130.

The abradable liner 167 is adjacent to the outer diameter of the fan assembly and provides a sacrificial surface against which the fan blades 122 may rub during normal operation to form a gas-tight seal.

The arrangement of low density and high density honeycomb materials provides a structurally stiff and compact sandwich structure. This sandwich structure is capable of absorbing the impact energy associated with the impact of ice or other foreign objects, or released fan blades 122.

Figure 6:
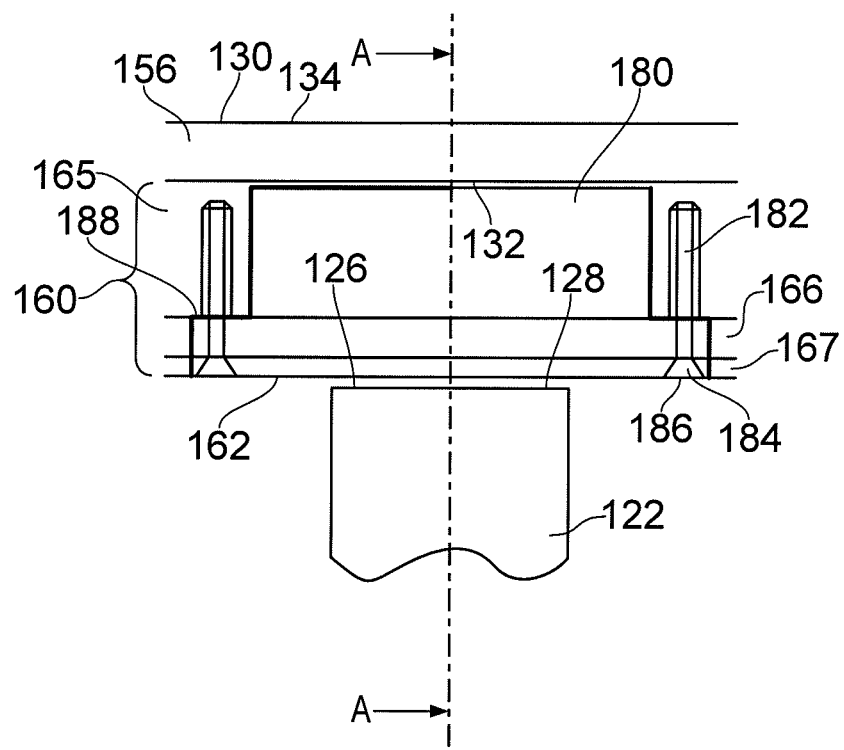
FIG. 6 shows a schematic, partial sectional radial view of the nacelle of FIG. 4.

In the present embodiment, a portion of the abradable liner and the low and high density honeycomb materials 167, 166, 165 is formed as a removable panel 180, as shown in FIG. 6, the panel 180 extending forward and rearward of the fan blades 122.

The panel 180 is secured in place in the nacelle structure 130 by a plurality of fasteners 184 each of which threadingly engage with corresponding threaded inserts 182 located in the containment portion 160.

The interface 188 between the panel 180 and the containment portion 160 is reinforced with additional layers of composite material to allow for repeated removal and replacement without adversely affecting the alignment of the panel 180 when installed in the containment portion 160.

Figure 7A:
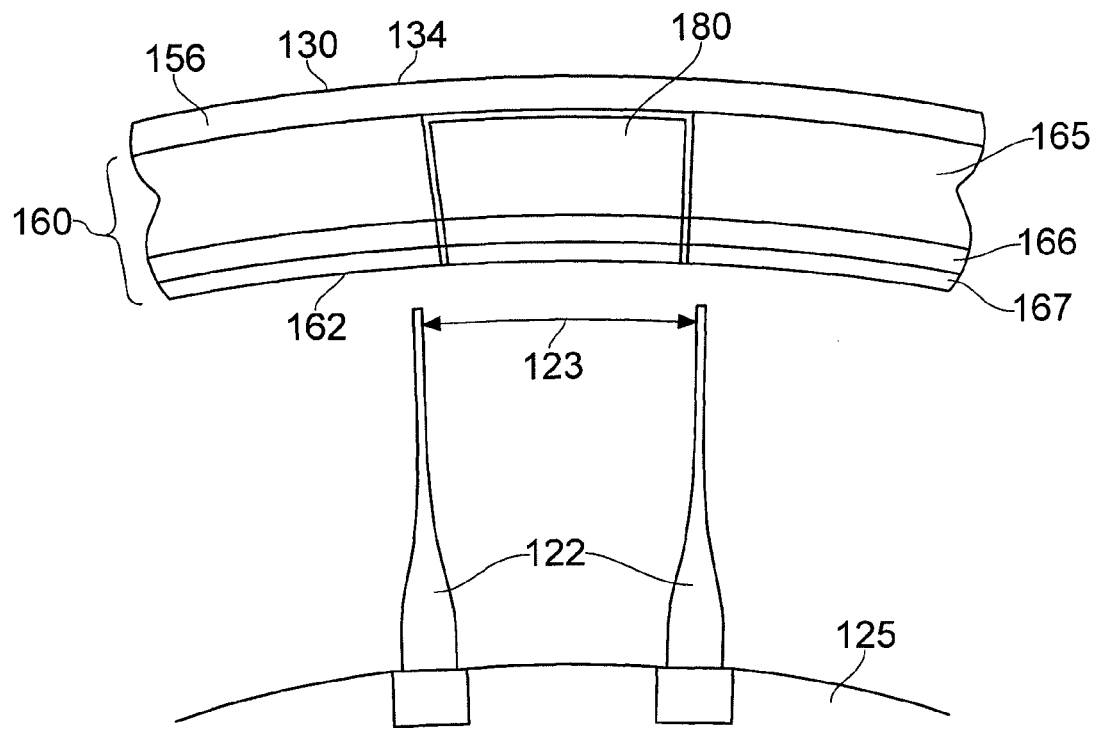
FIGS. 7A and 7B show schematic, partial sectional circumferential views of the nacelle of FIG. 4 showing how the removable liner panel allows the removal of a fan blade from its hub bearing assembly (for a variable pitch fan blade).
Figure 7B:
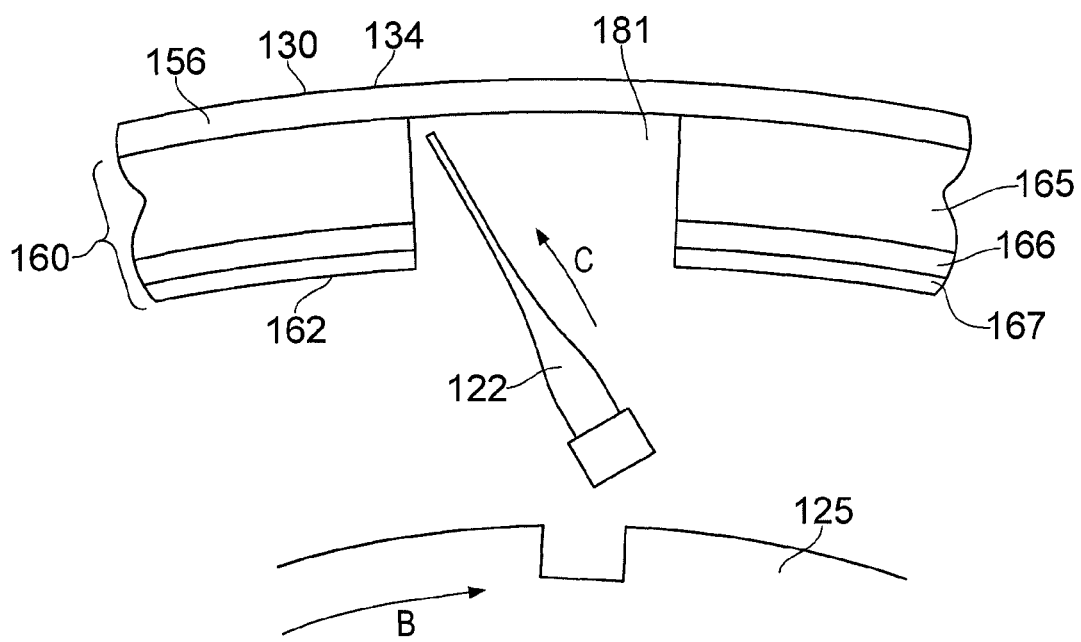

As shown in FIGS. 7A and 7B, the panel 180 may be removed to facilitate the removal of a single fan blade 122. The panel 180 is configured such that its circumferential length 190 is less than the pitch 123 between adjacent blades 122, when the fan blade 122 is in a feathered configuration (see FIG. 7A).

The fan assembly 120 is positioned such that two adjacent blades 122, in the feathered position, straddle the panel 180. This enables the panel 180 to be detached and withdrawn from between the two fan blades 122.

The fan assembly 120 is then rotated by half the fan blade pitch 123 to leave one of the fan blades 122 aligned with the space 181 left by the removal of the panel 180. The fan blade 122 is then released from the fan hub 125 and moved radially outwards from the hub 125 into the space 181.

A replacement fan blade 122 may then be installed in the hub 125, the fan assembly rotated by half the fan blade pitch 123, and the panel 180 replaced.

The nacelle structure 130 includes a recess or void 170. The void 170 is filled with a void filler material 172, such as, in this case, a honeycomb material or syntactic foam (such as Rohacell™). The void filler material 172 is then covered with an acoustic panel 174, in this case an acoustic honeycomb with a perforate skin. This arrangement of filler material and acoustic panel 172, 174 provides structural reinforcement, FOD resistance and acts as an acoustic liner.

A radial thickness 136 of the nacelle structure 130 varies along an axial length 135 of the nacelle structure 130 such that the variation defines an aerofoil profile.

A forward portion of the first, radially proximal surface 132 of the nacelle structure 130 is formed as an inlet diffuser 144.

The aircraft propulsion system nacelle 100 further comprises a nacelle structure support 142, the nacelle structure 130 and the nacelle structure support 142, being separated by a nacelle joint 146. The nacelle joint 146 is oriented normally to the axis of rotation 124. The nacelle structure 130 and nacelle structure support 142 each extend from the nacelle joint towards the inlet 112 and exhaust 114 of the engine assembly 110 respectively.

The nacelle structure support 142 is attached to the engine assembly 110, while the nacelle structure 130 is removably attached to the nacelle structure support 142. The nacelle structure 130 can be removed to provide maintenance and repair access to the fan assembly 120.

Figure 1:
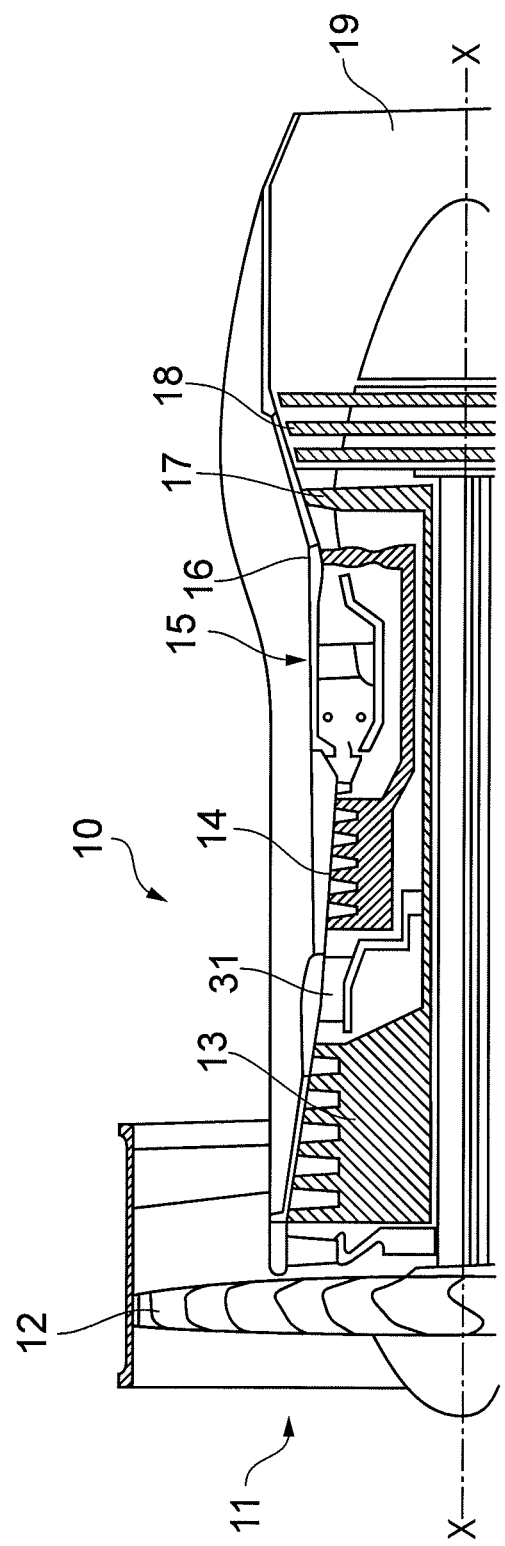
FIG. 1 shows a schematic partial sectional view of a gas turbine engine according to the prior art.
Figure 2:
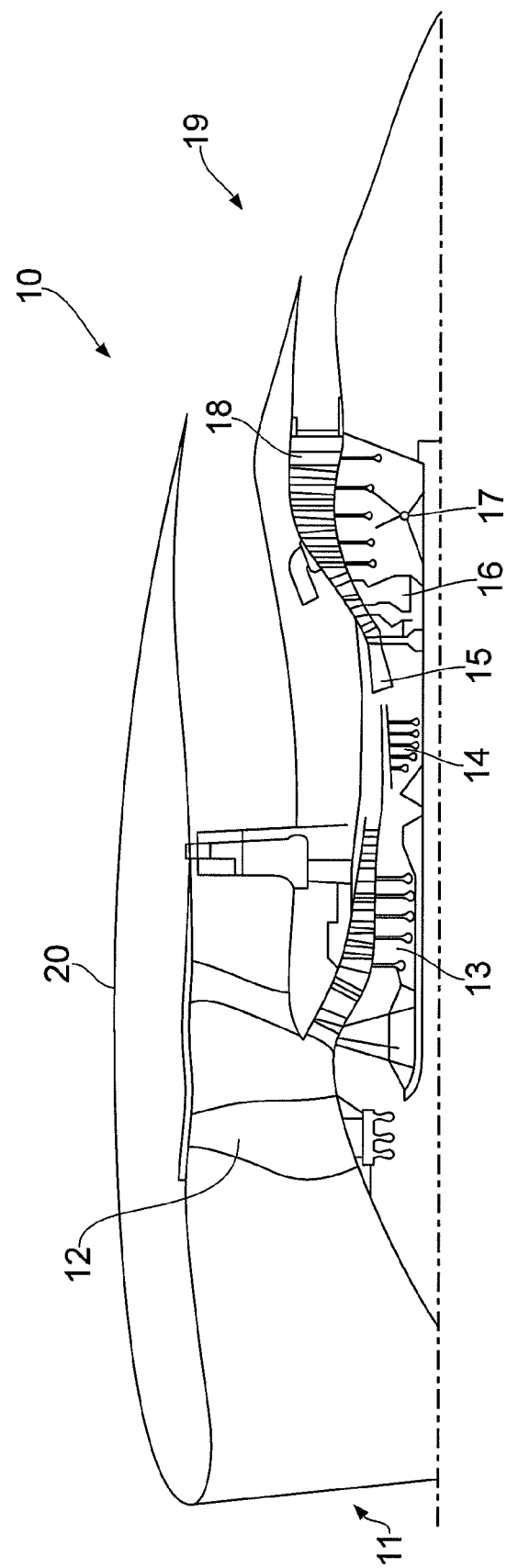
FIG. 2 shows a schematic, partial sectional view of a high bypass ratio aircraft gas turbine engine according to the prior art.

In a conventional aircraft turbofan engine, as shown in FIG. 2, the nacelle assembly 20 is formed as a hollow monocoque structure and is used to contain several engine sub-systems, such as, for example, oil tank, heat exchangers, LP gearbox and thrust reverser mechanism.

In the embodiment of the present invention, these sub-systems have been eliminated or relocated to the internal core of the main engine assembly 110. For example, the fuel/oil heat exchanger has been moved to the engine core, while the incorporation of a variable pitch mechanism into the fan assembly 120 enables the pitch of the fan blades to be reversed thereby providing a reverse thrust facility. This enables the radial thickness 136 of the nacelle structure 130 to be significantly reduced.

In the present embodiment, a ratio of an outer diameter 128 of the fan assembly 120 to an outer diameter 138 of the nacelle structure 130 is 0.90. In this arrangement, for a given nacelle outer diameter 138 the fan assembly diameter 128 is approximately 400 mm (16 in) larger than that of a conventional prior art turbofan engine 10.

In addition, in the present embodiment, since the nacelle structure 130 is no longer required to contain a thrust reverser mechanism, the nacelle structure 130 may be made axially shorter than that of a conventional prior art turbofan engine 10.

The nacelle structure 130 of the present embodiment has a ratio of nacelle assembly length 135 to fan assembly outer diameter 128 of 1.15. In contrast, the ratio of nacelle assembly length to fan assembly outer diameter of a conventional prior art turbofan engine is typically greater than 1.30.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

The invention claimed is:

1. An aircraft propulsion system nacelle comprising:
   a) an engine assembly; and
   b) a fan assembly operatively connected to the engine assembly, and comprising a plurality of fan blades arranged circumferentially around an axis of rotation; and
   c) a monolithic nacelle structure which circumferentially encloses the fan assembly, and comprises a first, radially proximal, surface locatable radially outward of the plurality of fan blades, and an opposite, second, radially distal, surface which forms a radially outermost surface of the aircraft propulsion system nacelle, and wherein a radial thickness of the nacelle structure is greater at a first, inlet portion than at a plane of the fan assembly normal to the axis of rotation.

2. An aircraft propulsion system nacelle as claimed in claim 1, wherein the nacelle structure further comprises an integral, energy absorbing, containment portion positioned between the fan assembly and the first surface of the nacelle structure.

3. An aircraft propulsion system nacelle as claimed in claim 1, wherein the nacelle structure is formed as a metal forging, with the metal being selected from the group comprising steel, titanium, aluminum and alloys thereof.

4. An aircraft propulsion system nacelle as claimed in claim 1, wherein the nacelle structure is formed from a fiber reinforced composite material, with the composite fiber being selected from the group comprising glass, carbon, boron, aramid and combinations thereof.

5. An aircraft propulsion system nacelle as claimed in claim 1, wherein the nacelle structure comprises one or more voids.

6. An aircraft propulsion system nacelle as claimed in claim 5, wherein at least one of the one or more voids is filled with a material having a lower density than the material forming the nacelle structure.

7. An aircraft propulsion system nacelle as claimed in claim 1, wherein the fan assembly has a fan pressure ratio of less than 1.3.

8. An aircraft propulsion system nacelle as claimed in claim 1, wherein a ratio of an outer diameter of the fan assembly to an outer diameter of the nacelle structure is greater than 0.87.

9. An aircraft propulsion system nacelle as claimed in claim 2, wherein the containment liner assembly comprises a plurality of energy absorbing panels, each panel extending axially along the first surface of the nacelle structure.

10. An aircraft propulsion system nacelle as claimed in claim 9, wherein at least one of the plurality of energy absorbing panels is individually replaceable.

11. An aircraft propulsion system nacelle as claimed in claim 1, further comprising a nacelle structure support, the nacelle structure support being attached to the engine assembly, and the nacelle structure being removably attached to the nacelle support structure to thereby expose the fan assembly.

12. An aircraft propulsion system nacelle as claimed in claim 11, wherein the nacelle structure comprises an inlet diffuser.

13. An aircraft propulsion system nacelle as claimed in claim 1, wherein a ratio of the combined length of the nacelle structure and nacelle support structure to an outer diameter of the fan assembly is less than 1.25.

14. An aircraft propulsion system nacelle as claimed in claim 1, further comprising a thrust reverser means operable to produce reverse thrust by selectively varying a pitch angle of the plurality of fan blades.

15. An aircraft propulsion system nacelle as claimed in claim 1, wherein the nacelle structure further comprises an integral, energy absorbing, containment portion positioned adjacent to the first surface of the nacelle structure.

* * * * *